United States Patent Office 2,852,560
Patented Sept. 16, 1958

2,852,560

N-(4-CYCLOHEXYLCYCLOHEXYL) POLYCHLORO-ALIPHATIC MONOCARBOXYLIC ACID AMIDES

Harry F. Brust, Midland, Mich., assignor to The Dow Chemical Company, Midland, Mich., a corporation of Delaware No Drawing. Application February 7, 1957
Serial No. 638,671

4 Claims. (Cl. 260—561)

The present invention relates to the N-(4-cyclohexylcyclohexyl)-polychloroaliphatic monocarboxylic acid amides having the formula

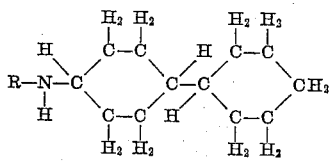

In this and succeeding formulae, R represents a polychloroacyl radical of the lower aliphatic monocarboxylic acid series containing from 2 to 5 carbon atoms, inclusive. These new compounds are somewhat soluble in many organic solvents and of low solubility in water. They have been found to be active as parasiticides and are adapted to be employed as active toxic constituents of compositions for the control of many pests such as *Alternaria solani*.

The new compounds may be prepared by reacting (bicyclohexyl)-4-amine with a lower alkyl ester of a chloroaliphatic monocarboxylic acid having the formula R—O-lower alkyl wherein "lower alkyl" refers to the alkyl radicals containing from 1 to 4 carbon atoms, inclusive. The reaction may be carried out in the presence of a solvent inert under the conditions of reaction such as ethanol and diethyl ether. The reaction proceeds smoothly within the temperature range of from about 0° to 100° C. with the production of the desired product and lower alkanol of reaction. Good results are obtained when substantially equimolecular proportions of the reactants are employed. The employment of an excess of the ester reactant generally results in optimum yields.

In carrying out the reaction, the (bicyclohexyl)-4-amine and a lower alkyl ester are mixed or otherwise blended together and the resulting mixture maintained for a period of time at a temperature of from 10° to 100° C. If desired, the reaction may be carried out in an inert solvent. When operating in the presence of a suitable solvent, the reaction conveniently may be carried out at the boiling temperature of the reaction mixture and under reflux. During the reaction, the desired product precipitates in the reaction mixture as a crystalline solid. Upon completion of the reaction, as evidenced by the substantial cessation of the precipitation of the desired product, the latter may be separated by filtration or decantation.

The (bicyclohexyl)-4-amine employed as a starting material in the present invention occurs in two isomeric forms known as the alpha and beta isomers. These two isomers may be prepared by known methods. In such methods, cyclohexylcyclohexanol is dehydrogenated over a copper catalyst at 300° C. to form cyclohexylcyclohexanone, and this product thereafter ammoniated to form a 4-cyclohexylcyclohexanone imine. The latter is thereafter hydrogenated over a nickel catalyst at 60° C. and 75 pounds pressure per square inch to give a reaction mixture containing about equal amounts of the alpha and beta isomers of the (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The following examples illustrate the invention but are not to be construed as limiting:

Example 1.—N-(4-cyclohexylcyclohexyl)-2,2-dichloropropionamide-α-isomer

Twenty grams (0.092 mole) of (bicyclohexyl)-4-amine α-isomer was mixed with 19 grams (0.134 mole) of ethyl 2,2-dichloropropionate dispersed in 10 milliliters of ethanol and the resulting mixture heated at the boiling temperature, 78° C., and under reflux for 16 hours. During the heating a precipitate formed. Upon completion of the heating, the reaction mixture was cooled to room temperature and the precipitate separated by filtration to obtain an N-(4-cyclohexylcyclohexyl)-2,2-dichloropropionamide α-isomer product. This product was recrystallized from ethanol and found to melt at 223°–225° C.

Example 2.—N-(4-cyclohexylcyclohexyl)-2,2-dichloropropionamide β-isomer

16.6 grams (0.082 mole) of (bicyclohexyl)-4-amine β-isomer was mixed with 13.0 grams (0.092 mole) of ethyl 2,2-dichloropropionate dispersed in 20 grams of ethanol and the resulting mixture heated at the boiling temperature, 78° C., and under reflux for 16 hours. During the heating, a precipitate formed. Upon completion of the heating, the reaction mixture was cooled to room temperature and the precipitate separated by filtration to obtain an N-(4-cyclohexylcyclohexyl)-2,2-dichloropropionamide β-isomer product. This product was recrystallized from ethanol and found to melt at 205°–206° C.

Example 3.—N-(4-cyclohexylcyclohexyl)-2,2,2-trichloroacetamide α-isomer

4.0 grams (0.022 mole) of (bicyclohexyl) 4-amine-α-isomer was mixed with 5.0 grams (0.0244 mole) of methyl trichloroacetate dispersed in 50 milliliters of diethyl ether. The resulting mixture was heated at the boiling temperature, 65° C., and under reflux for 16 hours. Upon completion of the reaction, the reaction mixture was processed as described in Example 2 to obtain an N-(4-cyclohexylcyclohexyl)-2,2,2-trichloroacetamide α-isomer product as a crystalline solid. This product was recrystallized from methanol and found to melt at 165°–166° C.

In a similar manner other amides may be prepared as follows:

N-(4-cyclohexylcyclohexyl)-2,2,3-trichloropropionamide α-isomer by reacting together (bicyclohexyl)-4-amine α-isomer and ethyl 2,2,3-trichloropropionate.

N-(4-cyclohexylcyclohexyl)-2,2-dichloroacetamide β-isomer by reacting together (bicyclohexyl)-4-amine β-isomer and methyl dichloroacetate.

N-(4-cyclohexylcyclohexyl)-2,2-dichlorobutyramide α-isomer by reacting (bicyclohexyl)-4-amine α-isomer and ethyl 2,2-dichlorobutyrate.

N-(4-cyclohexylcyclohexyl)-2,2-dichloroisovaleramide

α-isomer by reacting together (bicyclohexyl)-4-amine α-isomer and ethyl α,α-dichloroisovalerate.

N-(4-cyclohexylcyclohexyl)-2,2-dichlorobutyramide β-isomer by reacting together (bicyclohexyl)-4-amine β-isomer and butyl 2,2-dichlorobutyrate.

The preferred esters of the present invention are those prepared from the 2,2-dichloroalkanoic acids and 2,2,3-trichloroalkanoic acids such as dichloroacetic acid, trichloroacetic acid, 2,2-dichloropropionic acid, 2,2,3-trichloropropionic acid, 2,2-dichlorobutyric acid, 2,2,3-trichlorobutyric acid, 2,2-dichlorovaleric acid and 2,2,3-trichlorovaleric acid.

The new N-(4-cyclohexylcyclohexyl)-chloroacylamides have been tested and found useful as parasiticides. For such use, the products may be dispersed on an inert finely divided solid and employed as dusts. Also, such mixtures may be dispersed in water with the aid of a wetting agent, and the resulting aqueous suspension employed as sprays. In other procedures, the products may be employed in oils, as constituents of oil-in-water emulsions, or in water dispersions with or without the addition of wetting, dispersing or emulsifying agents. In representative operations, foliar applications of aqueous compositions containing 0.25 pounds of N-(4-cyclohexylcyclohexyl)-2,2-dichloropropionamide α-isomer per 100 gallons of ultimate mixture have been found to give substantially complete controls of tomato early blight, *Alternaria solani*.

I claim:
1. An N-(4-cyclohexylcyclohexyl)-chloroaliphatic acid amide having the formula

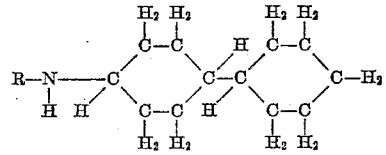

wherein R represents a polychloroacyl radical of the lower aliphatic monocarboxylic acid series containing from 2 to 5 carbon atoms, inclusive.

2. N - (4 - cyclohexylcyclohexyl) - 2,2 - dichloropropionamide α-isomer.

3. N - (4 - cyclohexylcyclohexyl) - 2,2 - dichloropropionamide β-isomer.

4. N - (4 - cyclohexylcyclohexyl) - 2,2,2 - trichloroacetamide α-isomer.

References Cited in the file of this patent
UNITED STATES PATENTS

| | | |
|---|---|---|
| 2,734,075 | Brust et al. | Feb. 7, 1956 |
| 2,734,076 | Pumpelly | Feb. 7, 1956 |
| 2,754,324 | Brust et al. | July 10, 1956 |